Figure 1:
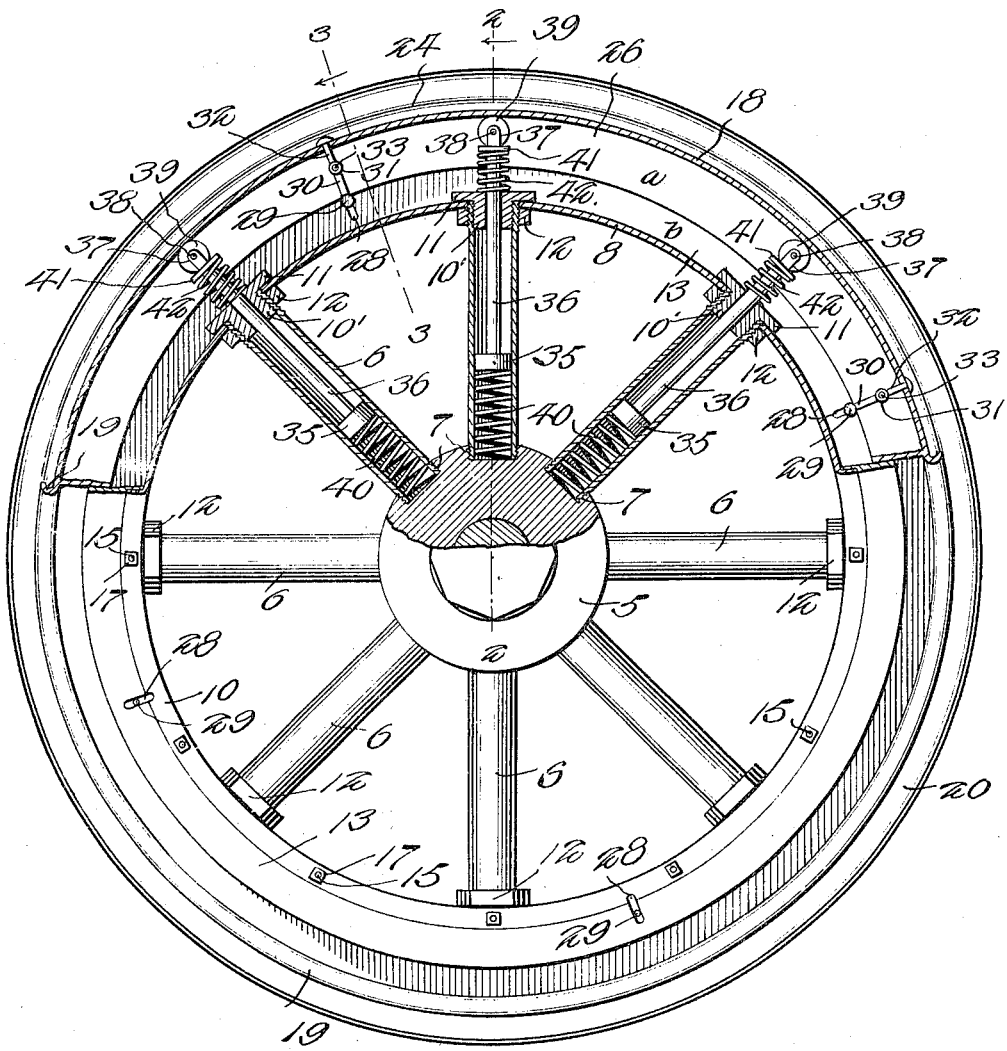

J. R. GERARD.
VEHICLE WHEEL.
APPLICATION FILED NOV. 30, 1910.

1,078,916.

Patented Nov. 18, 1913.

2 SHEETS—SHEET 1.

Witnesses

Inventor
Joseph R. Gerard
By Victor J. Evans
Attorney

J. R. GERARD.
VEHICLE WHEEL.
APPLICATION FILED NOV. 30, 1910.
1,078,916.
Patented Nov. 18, 1913.
2 SHEETS—SHEET 2.
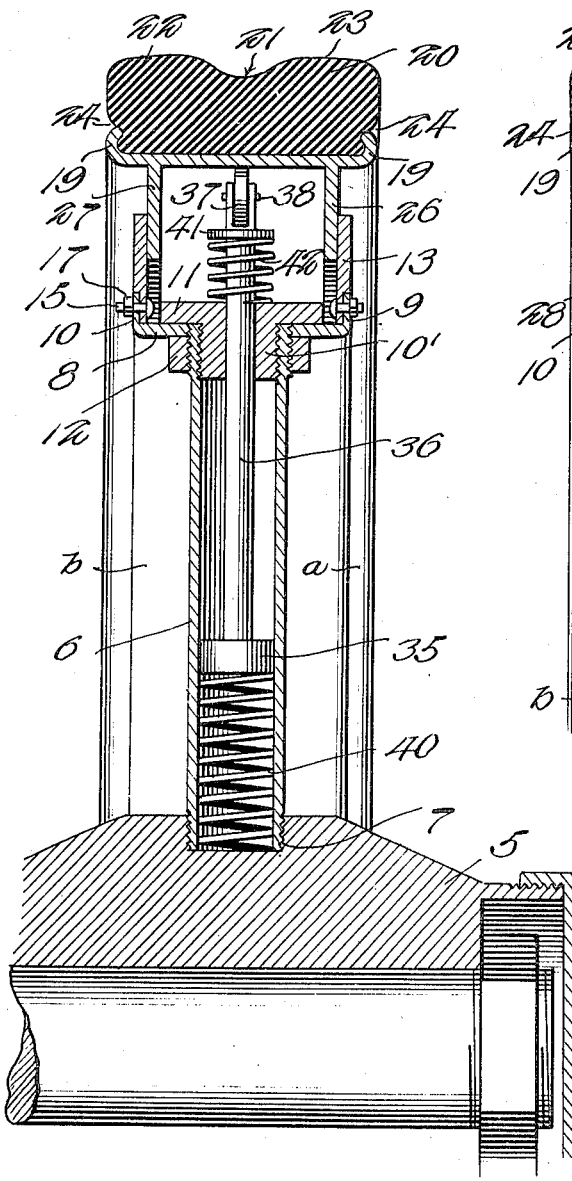
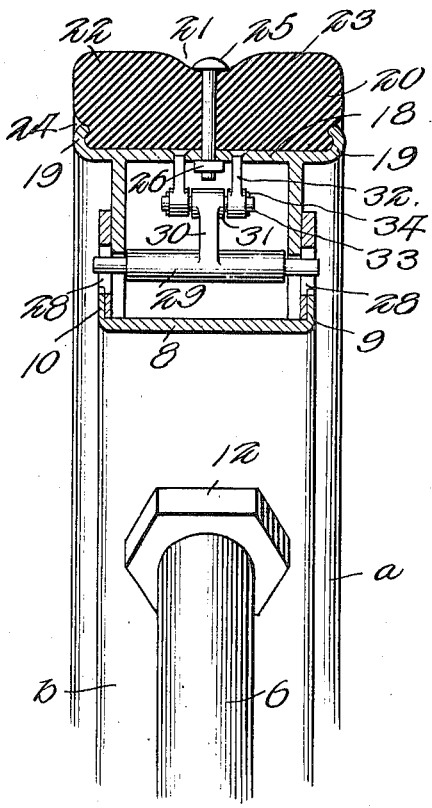
Witnesses
Inventor
Joseph R. Gerard
By Victor J. Evans
Attorney

UNITED STATES PATENT OFFICE.

JOSEPH R. GERARD, OF PARSONS, KANSAS.

VEHICLE-WHEEL.

1,078,916.　　　Specification of Letters Patent.　　Patented Nov. 18, 1913.

Application filed November 30, 1910. Serial No. 594,850.

*To all whom it may concern:*

Be it known that I, JOSEPH R. GERARD, a citizen of the United States, residing at Parsons, in the county of Labette and State of Kansas, have invented new and useful Improvements in Vehicle-Wheels, of which the following is a specification.

This invention relates broadly to vehicle wheels, but has specific reference to that type of vehicle wheels known as spring wheels which are primarily intended for use with motor vehicles in lieu of the ordinary pneumatic tire.

One object of the invention is the provision of a spring wheel provided with a pair of telescoping rim sections yieldingly held for relative movement.

Another object is the provision of a stop device for limiting the movement of the rim sections.

A further object is the provision of an improved form of spoke and means for securing the same to one of the rim sections.

With these and other objects in view, which will more fully hereinafter appear, the present invention consists in certain novel details of construction and arrangement of parts, hereinafter fully described, illustrated in the accompanying drawings, and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings forming part of the specification:—Figure 1 is an elevation and half section of the wheel. Fig. 2 is a section on the line 2—2 of Fig. 1. Fig. 3 is an enlarged sectional detail on the line 3—3 of Fig. 2 and looking in the direction of the arrow.

Similar numerals of reference are employed to designate corresponding parts throughout.

The hub 5 is preferably of metal and may be of any desired length. The spokes 6 are each preferably formed of a single length of metallic tubing. The hub 5 is provided with a plurality of radial screw-threaded openings 7, and the spokes 6 at one end portion thereof, are screw-threaded to engage with the screw-threads of the openings 7 of the hub 5.

The rim is made up of two relatively movable sections designated by $a$ and $b$. The section $b$ includes a channeled body portion 8 of any desired width. The body portion 8 is medially provided with a plurality of spaced threaded openings to receive the threaded outer end portions of the spokes 6. The outer end portions of the spokes 6 are interiorly screw-threaded for engagement with the exteriorly threaded nuts 10'. The bores of the nuts are smooth, and act as guides for the piston rods to be described later. The nuts 10' are provided with lateral circular flanges 11, which bear on the inner face of the body 8 of the section $b$. Jam nuts 12 are screwed onto the outer end portions of the spokes 6 and bear on the outer face of the body 8.

The sides or cheek plates 9 and 10 of the section $b$ are provided with detachable extensions 13 of any desired width and somewhat greater in thickness than the thickness of the cheek plates 9 and 10, and are provided with exteriorly circular rabbets which receive the cheek plates 9 and 10. The extensions 13 are detachably secured to the cheek plates 9 and 10 by means of bolts 15 passing through alining openings in the cheek plates and extensions, the said bolts being secured by means of nuts 17.

The section $a$ of the rim comprises an annular body portion 18 provided with clencher rims 19 for the tire 20. The tire 20 is preferably of solid rubber and its tread surface is grooved, as shown at 21, whereby, to provide the tread surfaces 22 and 23 whose function is to reduce skidding to a minimum. The opposite side portions of the tire 20 are provided with grooves 24 which receive the clencher rims 19. The tire is further secured to the body portion 18 by means of bolts 25 which are passed through openings in the groove 21, and are received by openings in the body portion 18, the inner ends of the bolts having screwed thereon nuts 26. Extending inwardly from the inner face of the body portion 18 of the section $a$ are cheek plates 26 and 27, which are received by the space between the extensions 13.

Connection between the sections $a$ and $b$ is established in the following manner:—

By reference now to the drawings it will be seen that the extensions 13 are provided with a plurality of spaced radial slots 28 which receive the reduced opposite ends of arms 29. Extending laterally and outwardly from the arms 29 are limbs 30, the outer end portions of which are provided with transverse openings to provide eyes 31. The limbs 30 extend to points adjacent to the inner surface of the body 18 of the outer section a. Extending inwardly from the body 18 and arranged on either side of the medial portion thereof are a plurality of studs 32, the inner ends of which are provided with openings to aline with the openings 31 of the limbs 30. Passing through the said openings are pins 33 secured with cotters 34. With this construction it will be manifest that the sections a and b are connected for relative movement, such movement being limited by virtue of the arms 29 engaging with the opposite ends of the slots 28. It might here be stated that the connections just described are positioned in alinement with the medial portion of the spaces between the spokes 6.

Slidingly fitted in the spokes 6 are pistons 35, from the outer ends of which extend piston rods 36, the said piston rods 36 passing through the smooth bores of the nuts 11 and into the space between the sections a and b. Formed in the outer end portions of the rods 36 are recesses 37 and passing through alining openings in the opposite sides of the recesses 37 are shafts 38, upon which are arranged rollers 39, portions of the peripheries of which extend beyond the outer ends of the rods 36 and bear on the inner surface of the body 18 of the outer section. The pistons 35 bear on the helical thrust springs 40 arranged in the openings 7 of the hub 5. Suitable washers 41 are secured to the outer end portions of the rods 36 and positioned between these washers 41 are helical thrust springs 42, the opposite ends of which bear on the washers and the flanges 11 of the nuts 10'.

With this construction it will be manifest as the wheel rotates the rim sections will move relatively to each other, since the weight of the vehicle will depress the springs moving to the lower side of the wheel during the rotation of the latter. As the tread surface of the wheel comes into contact with the ground this portion will be slightly depressed, and the lateral stress on the piston rod 36 which this action would ordinarily produce, will be overcome by the roller.

From the foregoing, it is evident that I have provided a device which is comparatively simple in structure and inexpensive to manufacture, embodying few parts and these so arranged that the danger of derangement will be reduced to a minimum.

What I claim as new is—

A spring wheel including a hub, a rim made up of telescopically arranged annular members having contact walls, one of said members being formed with alined slots, a pin rotatably mounted in the alined slots and underlying the adjacent edge of the other member, arms projecting from the relatively outer member, a rod projecting centrally from the pin and pivotally connected to the arm, a rigid connection between one of the annular members and the hub and means slidably mounted in said rigid connection for exerting radial pressure between the hub and the remaining annular member.

In testimony whereof I affix my signature in presence of two witnesses.

JOSEPH R. GERARD.

Witnesses:
D. H. HOLCOMB,
C. E. PILE.